July 23, 1957 M. ARTZT 2,800,527

MULTIPLE PICKUP FACSIMILE SCANNER

Filed May 17, 1950 3 Sheets-Sheet 1

INVENTOR
Maurice Artzt
BY
George T. Craig
ATTORNEY

MULTIPLE PICKUP FACSIMILE SCANNER

Filed May 17, 1950 3 Sheets-Sheet 2

INVENTOR
Maurice Artzt
BY
George T. Craig
ATTORNEY

MULTIPLE PICKUP FACSIMILE SCANNER

Filed May 17, 1950 3 Sheets-Sheet 3

INVENTOR
Maurice Artzt
BY
George T. Craig
ATTORNEY

United States Patent Office 2,800,527

Patented July 23, 1957

2,800,527

MULTIPLE PICKUP FACSIMILE SCANNER

Maurice Artzt, Princeton, N. J., assignor to Radio Corporation of America, a corporation of Delaware Application May 17, 1950, Serial No. 162,500

5 Claims. (Cl. 178—7.1)

This invention relates to facsimile systems, namely, but not exclusively, on the aspect of this subject as it concerns signal balance in a multiple pick-up scanner.

It is well known that the handling of subject copy in a facsimile scanner is simplified if the copy is formed into a half cylinder, rather than being wrapped on a drum type scanner. The paper sheet or web bearing the copy can be fed over a rotating optical system on a semi-cylindrical copy holder. A double optical system must be provided having two scanning points exactly 180° apart. As one point finishes a scanning line, the second point starts scanning the next line. Mechanical line up of the double optical system must be very accurate. The principal difficulty is that the two signal currents obtained from the two scanning points vary over wide limits. Optical correcting systems have been tried with poor success. When the scanner is running, they are inaccessible.

In accordance with this invention, an electrical balancing system is provided. Balancing adjustments may be made with the scanner running so that an accurate line up may be made at any time by simple oscillograph observations. The electrical balancing adjustment is convenient and stationary.

Accordingly, the principal aim of the invention is to provide an improved system for balancing a number of signals obtained from a facsimile scanner.

Another object is to provide a novel self-operating switching arrangement within the balancing system.

Other objects will be seen by reading this specification which refers to the drawing in which.

Figure 1:
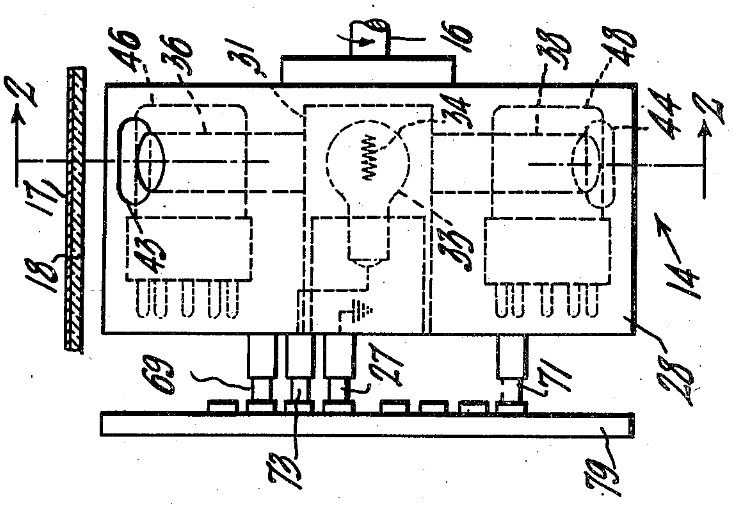
Figure 1 is an end view, partly in section, of the transmitter scanner embodying the invention, looking in the general direction of the arrow A of Fig. 2.
Figure 2:
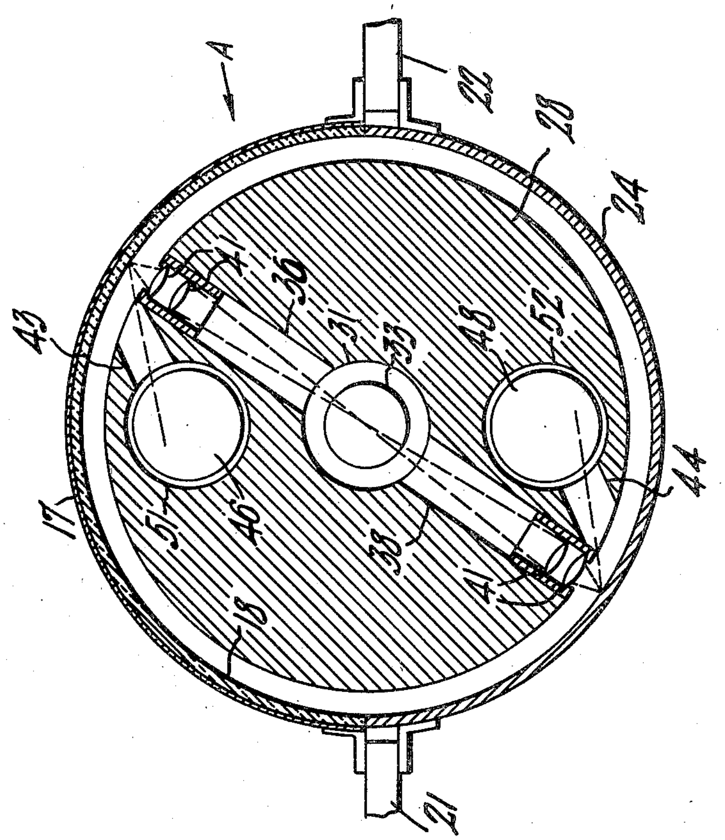
Figure 2 is a longitudinal sectional view of the scanner of Fig. 1, the section being taken on line 2—2.

Figures 1 and 2 show an optical scanner fitted for use in accordance with the invention. Mechanical drive details are omitted for convenience of description. A scanner having similar features is shown in Patent No. 2,298,911 granted to C. J. Young, October 13, 1942. The scanner comprises a rotatable head 14 which is driven by a shaft 16. Subject copy 17 is supported by a transparent semi-cylindrical member 18. Any suitable means (not shown) may be used for rotating the shaft and moving the member 18 axially at a coordinated rate. It will be understood that the member 18 may remain stationary and that the subject copy, printed or inscribed on a web, may be moved axially of the scanner. Such arrangements are known. Also, phasing and synchronizing systems are known which may be used in connection with the scanner of Figs. 1 and 2. Brackets 21 and 22 are indicated which provide support for the transparent copy holder 18. These brackets also support a 180° non-reflecting light shield 24. A similar light shield is disclosed and claimed in Patent No. 2,394,649 granted to C. J. Young, February 12, 1946. The head 14 includes a body member 28 which is recessed centrally as indicated at 31 to accommodate a lamp 33. Light from the lamp's filament 34 traverses two bores 36 and 38. Each bore is fitted with a lens system 41 for imaging a light spot on the outer surface of the copy holder 18. These light spots successively traverse the subject copy 17 to provide successive scanning lines. Two additional bores 43 and 44 are provided in the body member 28. Light reflected from the subject copy 17 traverses these bores and impinges on phototubes 46 and 48. These phototubes may project into recesses 51 and 52. Suitable socket and socket connections are provided as indicated schematically on Fig. 5. Each socket includes a bleeder resistor chain. These are designated 54 and 56 on Fig. 3. Each bleeder resistor chain is made up of a plurality of resistors 58 in series. The phototubes 46 and 48 may be the type 931A. Each tube includes dynodes 61 connected to the bleeder resistor chain.

Figures 3, 5:
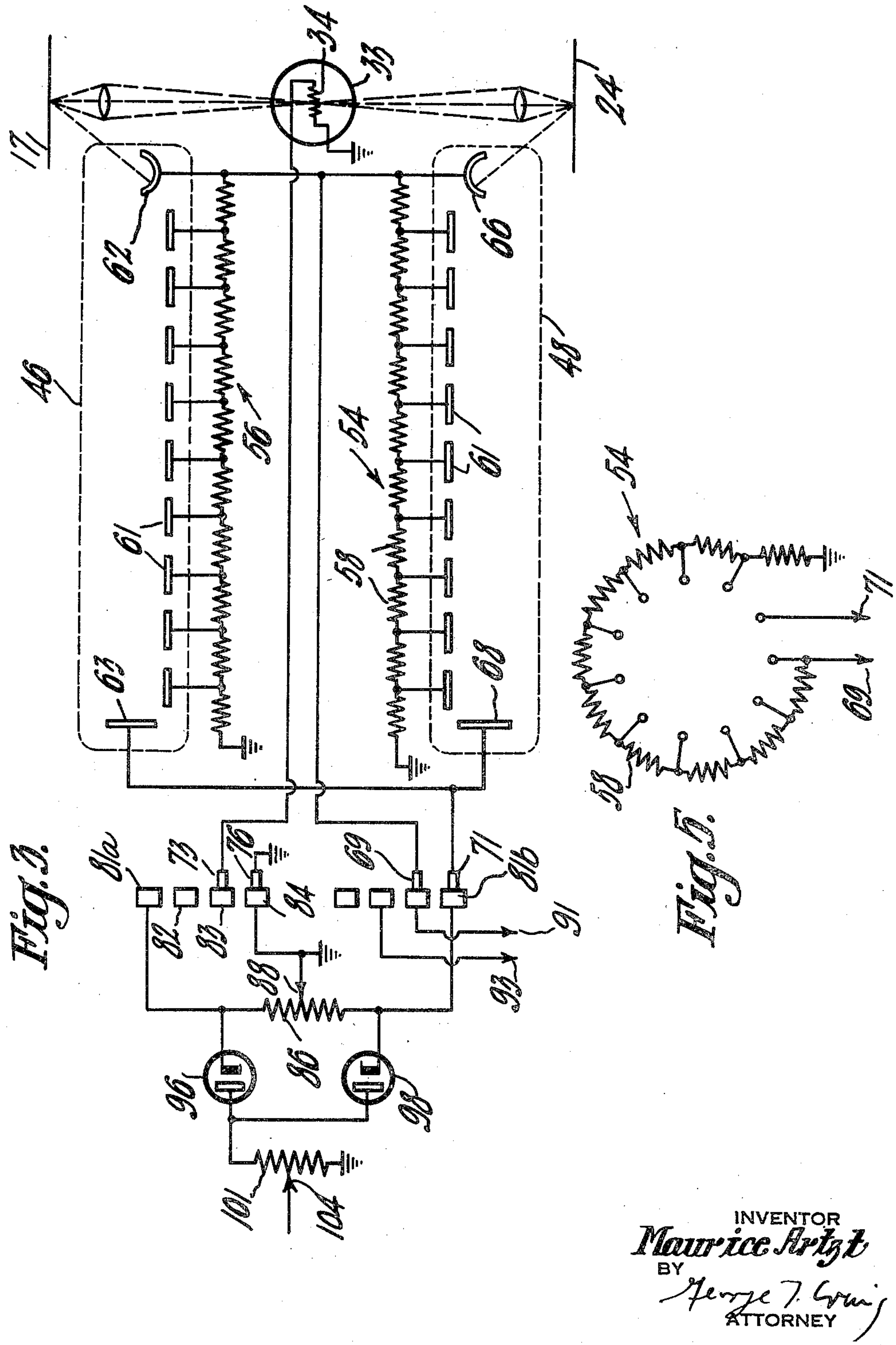
Figure 3 shows electrical features of a scanner connected in accordance with the invention.
Figure 5 is a wiring diagram of a multiplier phototube socket.

Referring to Figure 3, the cathode of phototube 46 is designated 62. Its anode is designated 63. The cathode of phototube 48 is designated 66, while its anode is designated 68. The cathodes 62 and 66 are connected to a brush 69. The anodes 63, 68 are connected to a brush 71. One terminal of the lamp 33 is connected by a suitable means to a brush 73. A brush 76 is grounded on the body member 28. The socket terminals on Fig. 5 have the same reference characters as the brushes.

The brushes just described are carried in any suitable manner by the body member 28 and are rotatable with it. A two-part stationary slip ring is mounted on a stationary slip ring support 79. The parts of this slip ring are designated **81*a* and 81*b*. Concentric slip rings 82 to 84 are also carried by the stationary holder 79**.

The slip ring parts **81*a* and 81*b* are connected to each end of a potentiometer resistor 86. The sliding contact 88 of the potentiometer is grounded. The phototube cathodes 62, 66, as well as one end of each dynode bleeder are connected through the slip ring 82 to a high voltage terminal 91. This provides a point of connection for a high voltage source (not shown). 1000 volts negative for the 931A phototubes may be applied to the terminal 91. The slip ring 83 is connected at the terminal 93 to a low voltage source, 5 volts positive, for example, for the lamp 33**.

The cathode of a diode 96 is connected to the slip ring part **81*a*. The cathode of the diode 98 is connected to the slip ring part 81*b*. The anodes of the diodes are joined and connected to ground through a potentiometer resistor 101. Output from the scanner 14 may be taken from the sliding contact 104**.

Only one phototube at a time produces a signal since the other will be prevented from receiving any reflected light by the non-reflecting shield 24. With both phototube outputs connected together as shown, the signal will alternate between the two phototubes. Part **81*a* of the slip ring is in contact with the brush 71 while the phototube 46 is scanning. Thus, the two phototube outputs are separately available for electrical balancing. Changing the variable contact 88 on the resistor 86 will increase the output resistor of one phototube while decreasing that of the other. The two outputs are added together through the diodes 96 and 98 so that proportioning of the percentage of the resistor 86 required for each phototube is effectively commutated by the current of the active phototube itself. The unused part of the resistor 86** for each half revolution of the scanner is effectively disconnected by the reverse polarity across the active diode.

Figure 4:
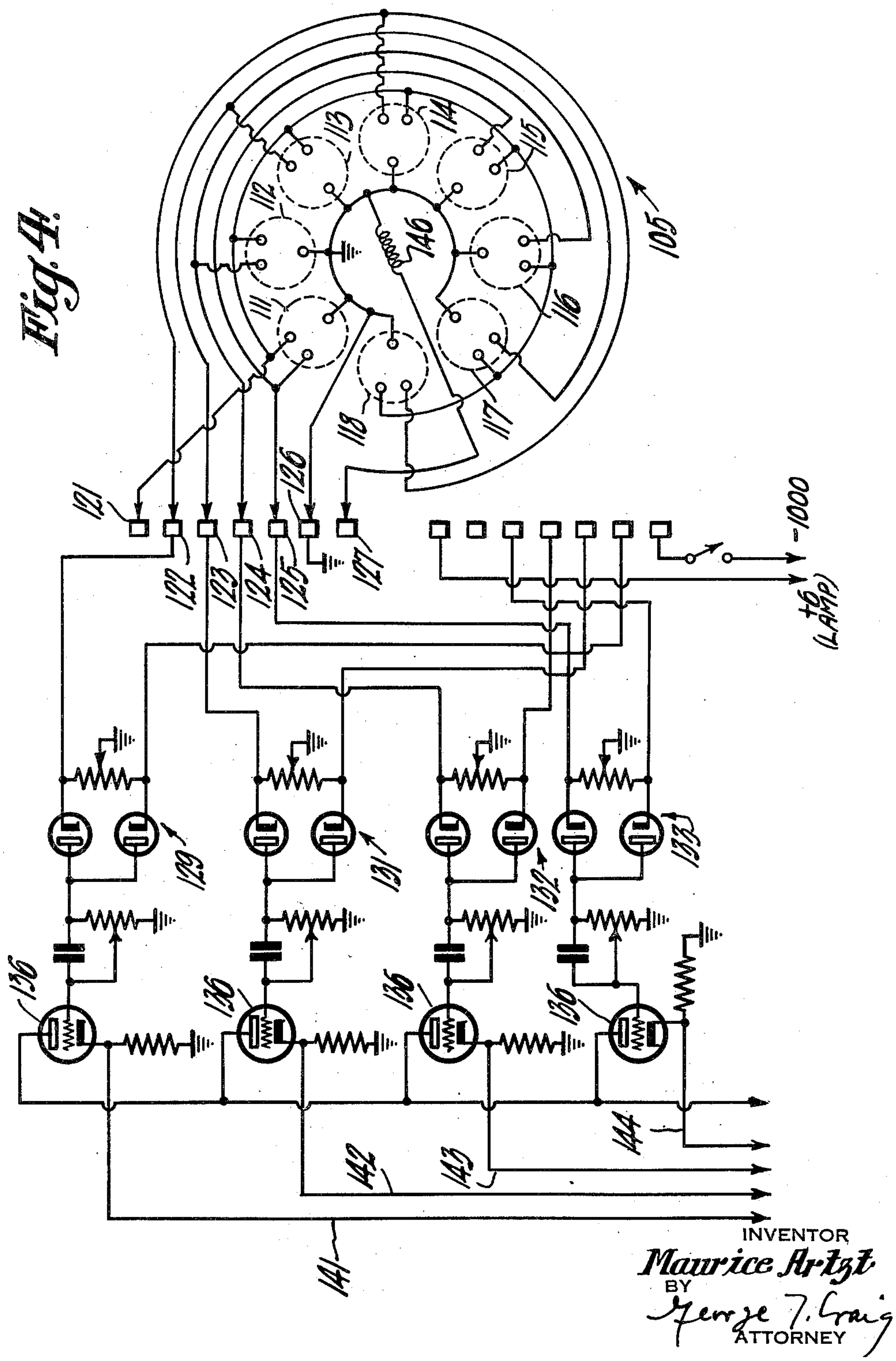
Figure 4 is a schematic showing of a multiplex system embodying the invention.

Fig. 4 shows the arrangement of this invention applied to a multiplex four-channel facsimile system. The scanner, shown schematically, is designated by reference character 105 and comprises eight phototubes mounted in pairs numbered 111 to 118. Each phototube has base connections somewhat as shown in Fig. 5 and connections are made to brushes and slip rings as shown. The slip rings are designated 121 to 127. The slip rings 122, 123, 124 and 125 are divided into two 180° segments. These slip rings correspond to the slip ring having the parts 81*a* and 81*b* of Fig. 3. It will be noted that one divided slip ring is provided for each channel. Pairs of diodes 129, 131, 132 and 133 are provided for each of the four channels. A cathode-coupled amplifier 136 is provided for each channel. The channel output terminals are designated 141, 142, 143 and 144. The slip ring 121 provides for connection of the phototube to the negative pole of a source (not shown) of high voltage. The slip ring 127 provides a power source connection for an exciting lamp 146.

What is claimed is:

1. A facsimile scanner comprising spaced scanning pick-up devices, means to illuminate said devices successively with image modulated light, an output circuit for said scanning devices comprising a resistor, means to connect a point on said resistor to a terminal common to said pick-up devices, means to connect said devices successively to the ends of said resistor in such manner that one of said devices is connected to one end of said resistor for a first interval and the other of said devices is connected to the other end of said resistor for a succeeding interval, and means connected to said resistor to add the outputs of said pick-up devices, whereby voltages corresponding to the outputs of said pick-up devices are adapted to appear successively and in the same sense across said adding means.

2. A facsimile scanner comprising spaced scanning pick-up devices, means to illumiante said devices successively with image modulated light, an output circuit for said scanning devices comprising a resistor, means to connect a point on said resistor to a terminal common to said pick-up devices, means to connect said devices successively to the ends of said resistor in such manner that one of said devices is connected to one end of said resistor for a first interval and the other of said devices is connected to the other end of said resistor for a succeeding interval, rectifying means connected to the ends of said resistor, and means whereby the outputs from said rectifiers are added, such that voltages corresponding to the outputs of said pick-up devices appear successively and in the same sense across said adding means.

3. In combination, a pair of photo-sensitive devices, means to illuminate said devices successively, an output circuit for said devices comprising a resistor, means to connect a point on said resistor to a terminal common to said devices, means to connect said devices successively to the ends of said resistor in such manner that one of said devices is connected to one end of said resistor for a first interval and the other of said devices is connected to the other end of said resistor for a succeeding interval, a pair of diodes, the cathode of each diode being connected to one end of said resistor, the anodes of said diodes being joined to provide an output connection for signals from said diodes, and a common load in circuit with said anodes, whereby voltages corresponding to the outputs of said pick-up devices are adapted to appear successively and with the same polarity across said load.

4. A facsimile scanner comprising spaced scanning pick-up devices, means to illuminate said devices successively with image modulated light, an output circuit for said scanning devices comprising a resistor, means to connect a point on said resistor to a terminal common to said pick-up devices, means to connect said devices successively to the ends of said resistor in such manner that one of said devices is connected to one end of said resistor for a first interval and the other of said devices is connected to the other end of said resistor for a succeeding interval, a pair of diodes, the cathode of each diode being connected to one end of said resistor, the anodes of said diodes being joined to provide an output connection for signals from said diodes, whereby voltages corresponding to the outputs of said pick-up devices are adapted to appear successively and with the same polarity at said output connection.

5. A facsimile scanner including first and second pick-up devices, means for illuminating said devices with image modulated light and an output circuit for said pick-up devices comprising a resistor, means for adjustably connecting a point on said resistor intermediate its ends to a terminal common to said pick-up devices, means for connecting said devices successively to the ends of said resistor in such manner that one of said devices is connected to one end of said resistor for a first interval and the other of said devices is connected to the other end of said resistor for a succeeding interval, and means connected across said resistor for adding the outputs of said pick-up devices such that voltages corresponding to the outputs of said pick-up devices appear successively and in the same sense across said adding means.

References Cited in the file of this patent

UNITED STATES PATENTS

| | | |
|---|---|---|
| 2,058,681 | Gould | Oct. 27, 1936 |
| 2,170,157 | Pray | Aug. 22, 1939 |
| 2,202,613 | Urtel | May 28, 1940 |
| 2,298,911 | Young | Oct. 13, 1942 |
| 2,303,830 | Dome | Dec. 1, 1942 |
| 2,361,973 | Smith | Nov. 7, 1944 |
| 2,551,726 | Cooley | May 8, 1951 |
| 2,565,213 | Folkenstein | Aug. 21, 1951 |